July 7, 1931.  H. D. WEED  1,813,718
ANTISKID TIRE CHAIN
Filed Feb. 20, 1931
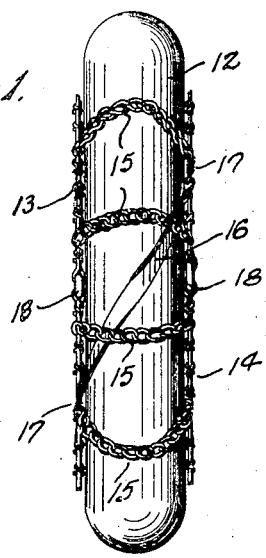
Fig. 1.
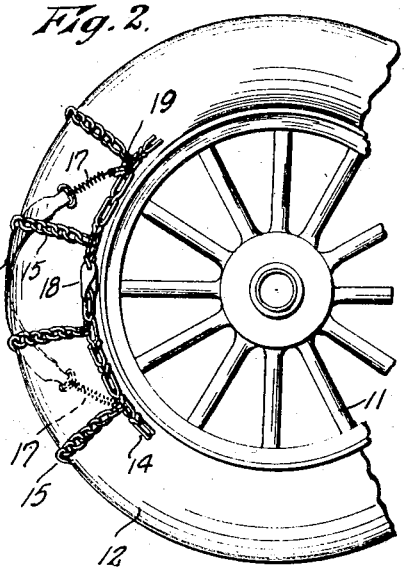
Fig. 2.
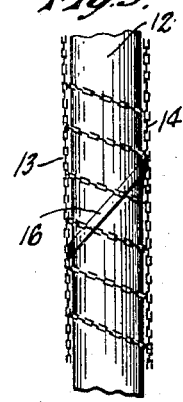
Fig. 3.
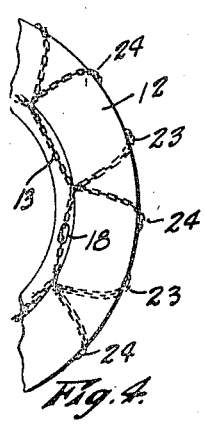
Fig. 4.
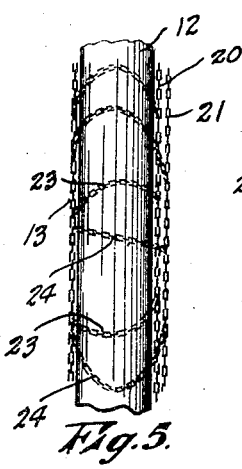
Fig. 5.
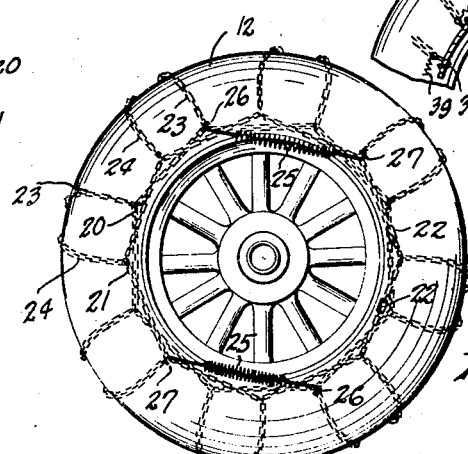
Fig. 6.
Fig. 10.
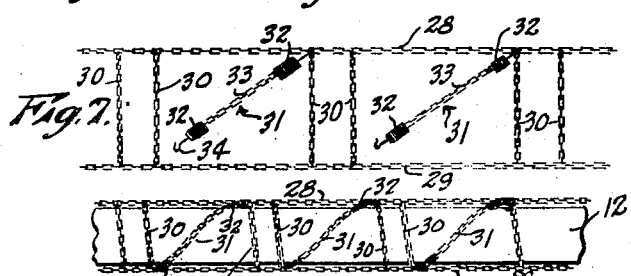
Fig. 7.
Fig. 8.
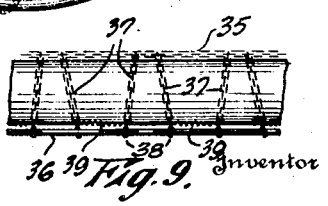
Fig. 9.
Inventor
Harry D. Weed
Wooster & Davis
Attorneys Patented July 7, 1931

1,813,718

UNITED STATES PATENT OFFICE

HARRY D. WEED, OF SOUTHPORT, CONNECTICUT

ANTISKID TIRE CHAIN

Application filed February 20, 1931. Serial No. 517,151.

This invention relates to non-skid or antislipping devices for vehicle wheels, particularly for automobile wheels, and has for an object to provide a simple and an effective device for preventing slipping and increasing traction which can be easily and quickly applied to and removed from the wheel.

It is a particular object of the invention to provide means for automatically tightening the device on the wheel and maintaining it tight under all conditions and operations even after considerable wear.

A common type of non-skid or anti-slipping device largely used at the present time comprises a pair of side chains connected by cross chains, the side chains being arranged on opposite sides of the tire and extending circumferentially thereof with the cross or connecting chains extending transversely over the tread of the tire. It has been found in practice that these devices are most effective if they can be held tight on the wheel with the cross members tightly fitting the tread, because it is found that if they are loose they will roll on the tread and pavement with a sudden application of brakes or driving power from the engine thus reducing traction and breaking the cross members. It has also been found that with the present day's high speeds centrifugal action due to these high speeds throws the cross members outwardly away from the tread so that when they hit the pavement they are spaced outwardly from the tread and therefore hit the pavement with a severe blow which soon breaks the links and hammers them out of shape and causes excessive wear so that the life of these elements is very short, being as a rule only a few hundred miles. This hammering also makes the chains very noisy in operation. In an attempt to overcome this the anti-slipping elements are applied as tightly as possible on the wheel, but it is difficult to get them tight under the usual conditions of application, and with the usual anti-slipping elements no matter how tightly they may be applied they very quickly work loose. Attempts have been made to provide automatic tightening means to keep them tight against the tread such as applying springs at the outer side of the wheel tending to draw the outer side chain at different points about the periphery of the wheel inwardly toward the center. This device although an improvement is not entirely satisfactory, particularly at high speeds as the springs do not effectively overcome the centrifugal action, and also these springs tend to draw the device out of position on the wheel because they can be applied only at one side of the wheel and tend to draw this side chain inwardly toward the center.

It is therefore a particular object of this invention to provide a construction which is sufficiently loose that it can be easily and quickly applied to and removed from the wheel, but will automatically maintain the cross elements tightly on the tread of the wheel by tending to shift them to an oblique position on the tread, to thus tighten them and at all times hold them tight and automatically compensate for wear and other conditions tending to loosen them on the wheel. It is also an object to provide this tightening effect in such a manner that it is not overcome or reduced by centrifugal action under high speeds.

With the foregoing and other objects in view the invention consists in certain novel features of construction, combinations and arrangement of parts as will be more fully disclosed in connection with the accompanying drawings forming a part of this specification, in which several different modifications and arrangements of the devices for carrying out the invention are disclosed. It is to be understood however, that various other modifications may be employed without departing from the principles of the invention. In these drawings:

Fig. 1 is an edge elevation of a vehicle wheel showing one form of my improved device applied thereto.

Fig. 2 is a side elevation thereof.

Fig. 3 is a diagrammatical edge view of a portion of a wheel indicating a change in the positions of the elements which may occur.

Fig. 4 is a side elevation of a portion of a wheel looking toward the inner side, showing diagrammatically a somewhat modified construction of anti-slipping device.

Fig. 5 is an edge view thereof looking from the right of Fig. 4.

Fig. 6 is a side elevation looking toward the outer side of the wheel of Figs. 4 and 5.

Fig. 7 is a plan view of a section of an anti-slipping device showing another modification.

Fig. 8 is a diagrammatical edge view showing the position thereof applied to the wheel.

Fig. 9 is a diagrammatical edge view of a portion of a wheel showing another modification, and, Fig. 10 is a side elevation of the construction in Fig. 9.

As suggested above it is difficult to get the ordinary anti-slipping devices tight on the wheel and practically impossible to keep them that way for any length of time, and it is particularly difficult to overcome the centrifugal action which throws the cross elements outwardly away from the tread of the wheel so that there is a severe impact or hammering action against the pavement which soon breaks these elements, hammers them out of shape and causes excessive wear. I overcome these objections by providing means for shifting the cross members to an oblique position on the tread and holding them there to thus tighten these members on the tread and keep them tight. This may be accomplished in several different ways a few of which are illustrated in the drawings, but it will be understood other ways may be applied to accomplish this result.

Referring first to Figs. 1, 2 and 3 there is shown at 11 an ordinary type of automobile wheel carrying the usual type of tire 12. My improved non-skid or anti-slipping device comprises two side members 13 and 14 to be positioned on opposite sides of the wheel to extend in a direction circumferentially thereof and to which are connected cross members 15 providing anti-slipping mediums. In the drawings I have shown flexible chains of usual and standard construction as it has been found that such chains are about as effective as anything for giving traction known at the present time, especially the twisted link chains, but I wish it to be distinctly understood that I am not limited to the use of such elements, as various side elements and cross elements can be employed, it merely being necessary that the side elements be capable of anchoring the ends of the cross elements, and that the cross elements be capable of increasing the traction or grip of the tread on the road.

In order to tighten the device on the wheel and maintain it in this condition the device of Figs. 1, 2 and 3 includes one or more diagonal or oblique members 16 extending obliquely over the tread of the wheel and secured at its opposite ends to the side members 13 and 14. This element is a resilient element the resiliency being secured by making the element itself resilient, such for example as making it of live rubber or by providing one or more springs 17 or both. This oblique strap of the resilient element being connected to the side members 13 and 14 as indicated under stress tends to draw or shift the two side members 13 and 14 in opposite directions about the circumference of the wheel. That is, this resilient stressed element 16 tends to shift the side members 13 and 14 in opposite directions about the periphery of the wheel, and it will thus be evident that if the device is placed on the wheel as indicated with the cross elements 15 extending over the tread of the wheel then the action of the member or members 16 tend to shift the opposite ends of the cross members in opposite directions and cause them to lie obliquely on the tread. If the device is fairly tight when first applied to the wheel of course the cross members will be only slightly inclined, but if it is fairly loose their angularity or inclination will be greater.

In Figs. 1 and 2 the angularity is very small but in Fig. 3 it is shown much greater. For best effect the various elements should be so proportioned that the tightening member 16 is connected to the side members 13 and 14 so as to pull on these side members in a direction substantially tangentially thereof as this is the position in which the greatest effect is secured.

It will be evident that with this construction and arrangement no complicated constructions are required to be applied to the device. It will also be evident that the device may be very loose when applied to the wheel so that its application is facilitated and made very easy. The side members 13 and 14 may be detachably connected by any of the ordinary types of hook connections 18, and the member 16 is also detachably connected to the side members 13 and 14 by any suitable means such as the hooks 19. Thus in applying the device to the wheel it may be applied loosely in the usual manner by connecting the detachable hook elements 18 and then the ends of members 16 may be hooked in position. As soon as the wheel makes a few revolutions this member 16 has shifted one or both of the side members 13 and 14 so as to bring the cross members 16 to an oblique position on the tread. It will be obvious that this tightens these cross members on the tread and as the member 16 is resilient it effectively maintains these cross members in the tightened positions and automatically compensates for any wear or loosening up of the device in use.

Referring to Figs. 4, 5 and 6 I have shown in these figures a somewhat modified construction. On the inner side of the wheel is shown a side member 13 similar to that of the first form, the ends of which are detachably connected by any suitable type of detachable hook or connecting means 18. On the opposite or outer side of the wheel however, are provided two similar side members 20 and 21 detachably connected by suitable connecting members 22. In this construction there are two sets of cross members 23 and 24 corresponding to the cross members 15 of the first form. It will be noted that one end of each of these cross members is connected to the inner side members 13. They may be connected at any desired location, but preferably the end of the member 23 is connected to member 13 adjacent the connection for the member 24 as indicated in Fig. 4. However, at the outer side of the wheel the members 23 and 24 are connected to different side members, the cross members 23 being connected to the side members 20 while the cross members 24 are connected to the side member 21.

The means for tightening the device on the wheel comprises one or more resilient elements 25. Preferably there are two of these elements located on opposite sides of the center of the wheel and connected at one end to the side member 20 as indicated at 26, and at its opposite end to the side member 21 as indicated at 27. This member 25 may be a spring or a live rubber element or similar resilient body of the desired strength. It will be evident that the resilient member 25 will tend to shift the side members 20 and 21 in opposite directions circumferentially of the wheel and therefore member 20 will tend to shift the ends of the members 23 connected thereto to bring these cross members to an oblique position on the tread and the member 21 will tend to shift the outer ends of the cross members 24 to bring them to an oblique position on the tread, but as they are shifted in the opposite direction they will be inclined in the opposite direction from the inclination of the cross members 23. Thus the two sets of cross members 23 and 24 not only are automatically tightened and held tight on the tread, but as they are inclined in opposite directions they neutralize any slight tendency there may be in each other due to their oblique positions to throw the wheel laterally.

In Figs. 7 and 8 is shown a somewhat different construction. In these figures the anti-slipping device comprises the side members 28 and 29 and suitably spaced cross members 30 connected to the side members to pass over the tread of the wheel. Certain ones however, of these cross members are sufficiently spaced for insertion of an oblique member 31 connected at its opposite ends to side members 28 and 29 and adapted as shown in Fig. 8 to extend obliquely over the tread of the wheel. These are also resilient members and may be resilient rubber bands 70 or may be spring elements as desired. Those illustrated comprise center portions 33 of chain or other suitable non-slipping construction and spring or resilient portions 42 adjacent either one or both ends, and provided at their ends with suitable attaching means such as hooks 34 whereby they may be connected to the side members. There may be any suitable number of these oblique members provided throughout the periphery of the wheel as desired, and it will be noted that the resilient members tend to shift the side members 28 and 29 in opposite directions to shift the cross members 30 to oblique positions, as indicated in Fig. 8, to tighten the device on the tread and hold it tight. This device may be applied loose to the wheel with one end of the elements 31 disconnected and then they may be individually connected to the side member to have the tightening effect as described.

In Figs. 9 and 10 is shown a somewhat different construction. In this arrangement there are two side members 35 and 36, and cross members 37 connected to the side members. One end of each of the cross members is attached to the side member 35 by any suitable means preferably permanently attached, but at the other side of the wheel they are so attached to the side member as to be slidable longitudinally thereon. Thus in the present construction one end of each of the cross members 37 is attached to the side member 35 so as to be held against longitudinal movement thereon, such for example as passing the end link through a suitable link of the side member 35 if it is a chain. The member 36 however, is a member to which the cross members 37 are so connected as to be slidable longitudinally thereon, and may be for example a wire or cable. The members 27 are preferably also detachable therefrom. Thus in the present instance the ends of the members 37 are provided with hooks 38 which engage around the member 36. Then the ends of the members 37 or the hooks 38 of two adjacent cross members are connected by a resilient member 39 under tension so that the resilient element 39, such as a spring or live rubber strip, tends to draw the two ends of the adjacent cross members toward each other as indicated and therefore shift these cross members to an oblique position on the tread. It will be evident that by shifting them to this position they will tighten them on the tread, and they will be retained in this position and automatically held tight to compensate for wear or other loosening effects. This anti-slipping device can be applied loosely to the wheel and then the resilient elements 39 applied to provide an automatic tightening effect.

It will be evident from the foregoing description that this anti-slipping device is very simple in construction and therefore may be manufactured and sold at relatively low cost, and that it may be easily and quickly applied to and removed from the wheel because it may be applied in a very loose condition and will automatically tighten itself as soon as the wheel makes a few revolutions. It will also be evident that it not only tightens itself automatically but it also automatically remains tight and automatically compensates for wear and other loosening effects. It gives a better grip on the road and the tire because as the cross members are always held tight they are prevented from rolling, and as the tightening means does not operate in direct opposition to centrifugal action this device is held tight even at high speeds without the use of unduly heavy tightening means. This prevents the heavy pounding of the chains on the road and also greatly reduces the noise which accompanies this pounding. It will be evident that in each of the forms shown the cross members are tightened by means which shifts them to an oblique position, although it is not necessary that all of the cross members be so inclined. It will also be evident that a number of different ways are available for shifting these cross members to this oblique or angular position. Thus for example the opposite ends of the cross members may be shifted in opposite directions circumferentially of the wheel or one end only may be shifted relative to the other end, and this shifting may be accomplished by either shifting the ends of the cross members relative to the side member or members or by shifting one or more of the side members. For the purpose of illustration the drawings show diagrammatically a conventional showing for chain but this is merely for illustration only, as I am obviously not limited to the use of chain but I may use any other well known suitable construction, such as rubber covered canvas or rubber strips which are now employed for a similar purpose, or I may use wire or cable for certain elements as desired. The standard chain construction however, has been found to be very satisfactory, such construction for example comprising non-extensible flexible side chains and transverse flexible anti-slipping members extending between the side members across the tread of the wheel.

Having thus set forth the nature of my invention, what I claim is:

1. An anti-slipping device for wheels, comprising attaching elements at opposite sides of the wheel, an anti-slipping medium secured to the attaching elements and extending across the periphery of the wheel, and means to shift the medium to an oblique position for tightening the device on the wheel.

2. An anti-slipping device for wheels, comprising attaching elements at opposite sides of the wheel, an anti-slipping medium secured to the attaching elements and extending across the periphery of the wheel, and means tending to change the angularity of the cross medium with respect to the plane of the wheel to tighten it on the wheel.

3. An anti-slipping device for wheels, comprising attaching elements at opposite sides of the wheel, anti-slipping elements secured to the attaching elements and extending across the periphery of the wheel, and means tending to shift the anti-slipping elements to oblique positions for tightening the device on the wheel.

4. An anti-slipping medium for wheels comprising side members and cross members, and a resilient member extending obliquely from side to side of the anti-slipping medium to tighten the anti-slipping medium on the wheel.

5. An anti-slipping device for wheels comprising flexible attaching elements extending circumferentially of the wheel on opposite sides thereof, flexible anti-slipping elements connected to the attaching elements and extending over the tread of the wheel, and means tending to shift one of the attaching elements relative to the other circumferentially of the wheel to increase the angularity of the anti-slipping elements to tighten them on the wheel.

6. An anti-skid device for elastic tires comprising side chains to be placed on opposite sides of the tire, cross chains to pass over the tire tread and connected to the side chains, and resilient means connecting the side chains and tending to shift them in opposite directions circumferentially of the tire to tighten the cross chains over the tread and hold them tight.

7. An anti-skid device for elastic tires comprising side chains to be placed on opposite sides of the tire, cross chains to pass over the tire tread and connected to the side chains, and resilient means tending to shift one side chain relative to the other circumferentially of the tire to tighten the cross chains over the tread and hold them tight.

8. An anti-skid device for elastic tires comprising side chains to be placed on opposite sides of the tire, cross chains to pass over the tire tread and connected to the side chains, and resilient means tending to shift one end of the cross chains circumferentially of the tire relative to the other ends to cause the cross chains to lie inclined to the tread to tighten them on the tread and hold them tight.

9. An anti-slipping device for wheels, comprising flexible side members to extend circumferentially of the wheel on opposite sides thereof, flexible cross members to extend transversely over the tread and connected to the side members, and resilient means tending to shift at least one of the side members circumferentially to shift the cross members to an oblique position to tighten them on the wheel.

10. An anti-slipping device for wheels, comprising flexible side members to extend circumferentially of the wheel on opposite sides thereof, flexible cross members to extend transversely over the tread and connected to the side members, and flexible resilient means to extend obliquely over the tread and connected to the side members so as to tend to shift these side members circumferentially in opposite directions and tighten the cross members on the tread.

11. An anti-slipping device for wheels, comprising flexible side members to extend circumferentially of the wheel on opposite sides thereof, flexible cross members to extend transversely over the tread and connected to the side members, and resilient means tending to shift the cross members to oblique positions on the tread to thus tighten these members and hold them in this position on the tread.

12. An anti-slipping device for wheels, comprising attaching elements at opposite sides of the wheel, anti-slipping elements secured to the attaching elements and extending across the periphery of the wheel, and means to shift one attaching element relative to another circumferentially of the wheel to tighten the anti-slipping elements on the wheel.

13. An anti-slipping device for wheels, comprising attaching elements at opposite sides of the wheel, anti-slipping elements secured to the attaching elements and extending over the tread of the wheel, and a resilient element extending obliquely over the tread of the wheel and secured to the attaching elements.

14. An anti-slipping device for wheels, comprising attaching elements at opposite sides of the wheel, anti-slipping elements secured to the attaching elements and extending over the tread of the wheel, and means tending to shift the attaching elements in opposite direction circumferentially of the wheel.

15. An anti-slipping device for wheels, comprising attaching elements at opposite sides of the wheel, anti-slipping elements secured to the attaching elements and extending over the tread of the wheel, and means tending to shift an end of the cross members relative to the other end to move the members to an oblique position on the wheel.

16. An anti-slipping device for wheels, comprising flexible side chains to be positioned on opposite sides of the wheel and flexible cross members extending over the tread of the wheel, and a flexible member extending obliquely over the tread of the wheel and connected to the opposite side members, said oblique member being resilient and tending to shift the side members in opposite directions to tighten the cross members on the wheel.

17. An anti-slipping device for wheels, comprising a side member to be positioned on one side of the wheel, a pair of side members to be positioned on the other side of the wheel, a plurality of cross members to extend over the tread and attached to the first side member, part of the cross members being connected to one of the pair of side members and the cross members being connected to the other of the pair of side members, and means tending to shift the individual side members of the pair in opposite directions circumferentially to shift the cross members to oblique positions.

18. An anti-slipping device for wheels, comprising a side member to be positioned on one side of the wheel, a pair of side members to be positioned on the other side of the wheel, a plurality of cross members to extend over the tread and attached to the first side member, alternate cross members being connected to one of the pair of side members and the other cross members being connected to the other of the pair of side members, and resilient means tending to shift the members of the pair in opposite directions to shift the cross members to oblique positions on the tread.

19. An anti-slipping device for wheels, comprising a side chain to be positioned on one side of the wheel, a pair of side chains to be positioned on the other side of the wheel, a plurality of cross members to extend over the tread and attached to the first side chain, part of the cross members being attached to one of the pair of side chains and the other cross members being attached to the other of the pair of chains, and resilient means connected to the pair of side chains and tending to shift these chains in opposite directions circumferentially of the wheel.

20. In an anti-slipping device for wheels, a pair of side members to be positioned on opposite sides of the wheel, cross members attached to the side members, the connections of the cross members to one side member permitting the cross members to move longitudinally of this side member, and resilient means tending to shift the ends of adjacent cross members attached to the latter side member in opposite directions to tighten the device on the wheel.

21. An anti-slipping device comprising a side member to be positioned on one side of a wheel, a cable to be positioned on the other side of the wheel and extending circumferentially thereof, cross members to extend over the tread of the wheel attached at one end to the first side member and held against longitudinal movement thereon, means for slidably connecting the cross members to the cable, and resilient means connected to spaced cross members and tending to shift their connections to the cable in opposite directions to tighten the device on the wheel.

In testimony whereof I affix my signature.

HARRY D. WEED.